United States Patent
Das

(10) Patent No.: US 8,255,724 B2
(45) Date of Patent: Aug. 28, 2012

(54) CONTROL OF AWAKE TIME IN MOBILE DEVICE WITH EVENT BASED TIME PERIOD FOLLOWED BY SLEEP MODE ALGORITHM

(75) Inventor: Dibakar Das, Bangalore (IN)

(73) Assignee: NXP B.V., Eindhoven (NL)

( * ) Notice: Subject to any disclaimer, the term of this patent is extended or adjusted under 35 U.S.C. 154(b) by 445 days.

(21) Appl. No.: 12/525,115

(22) PCT Filed: Jan. 28, 2008

(86) PCT No.: PCT/IB2008/050297
§ 371 (c)(1),
(2), (4) Date: Aug. 20, 2009

(87) PCT Pub. No.: WO2008/093278
PCT Pub. Date: Aug. 7, 2008

(65) Prior Publication Data
US 2010/0077234 A1    Mar. 25, 2010

(30) Foreign Application Priority Data
Feb. 1, 2007    (EP) .................................. 07101582

(51) Int. Cl.
*G06F 1/26* (2006.01)

(52) U.S. Cl. ...................................... 713/323; 455/574
(58) Field of Classification Search ................. 713/320, 713/323; 455/574; 710/18
See application file for complete search history.

(56) References Cited

U.S. PATENT DOCUMENTS

| | | | |
|---|---|---|---|
| 6,193,422 B1 * | 2/2001 | Belt et al. ..................... 713/320 |
| 6,480,476 B1 | 11/2002 | Willars | |
| 6,829,493 B1 | 12/2004 | Hunzinger | |
| 7,020,098 B2 | 3/2006 | Ehrsam | |
| 7,082,373 B2 * | 7/2006 | Holle ............................. 702/60 |
| 2004/0043797 A1 | 3/2004 | Shostak | |
| 2004/0152495 A1 | 8/2004 | Choi | |
| 2005/0273637 A1 | 12/2005 | Lu | |

FOREIGN PATENT DOCUMENTS

WO    0041057 A    7/2000

* cited by examiner

*Primary Examiner* — Albert Wang

(57) ABSTRACT

A method of operating a mobile device comprises operating the mobile device in a low power mode, switching the mobile device to a high power mode in response to an event, identifying the event as specific type of event, selecting a time period according to the identified type of event, preventing an algorithm for switching the mobile device to the low power mode from executing, for the time period, and (ultimately) executing the algorithm.

18 Claims, 5 Drawing Sheets

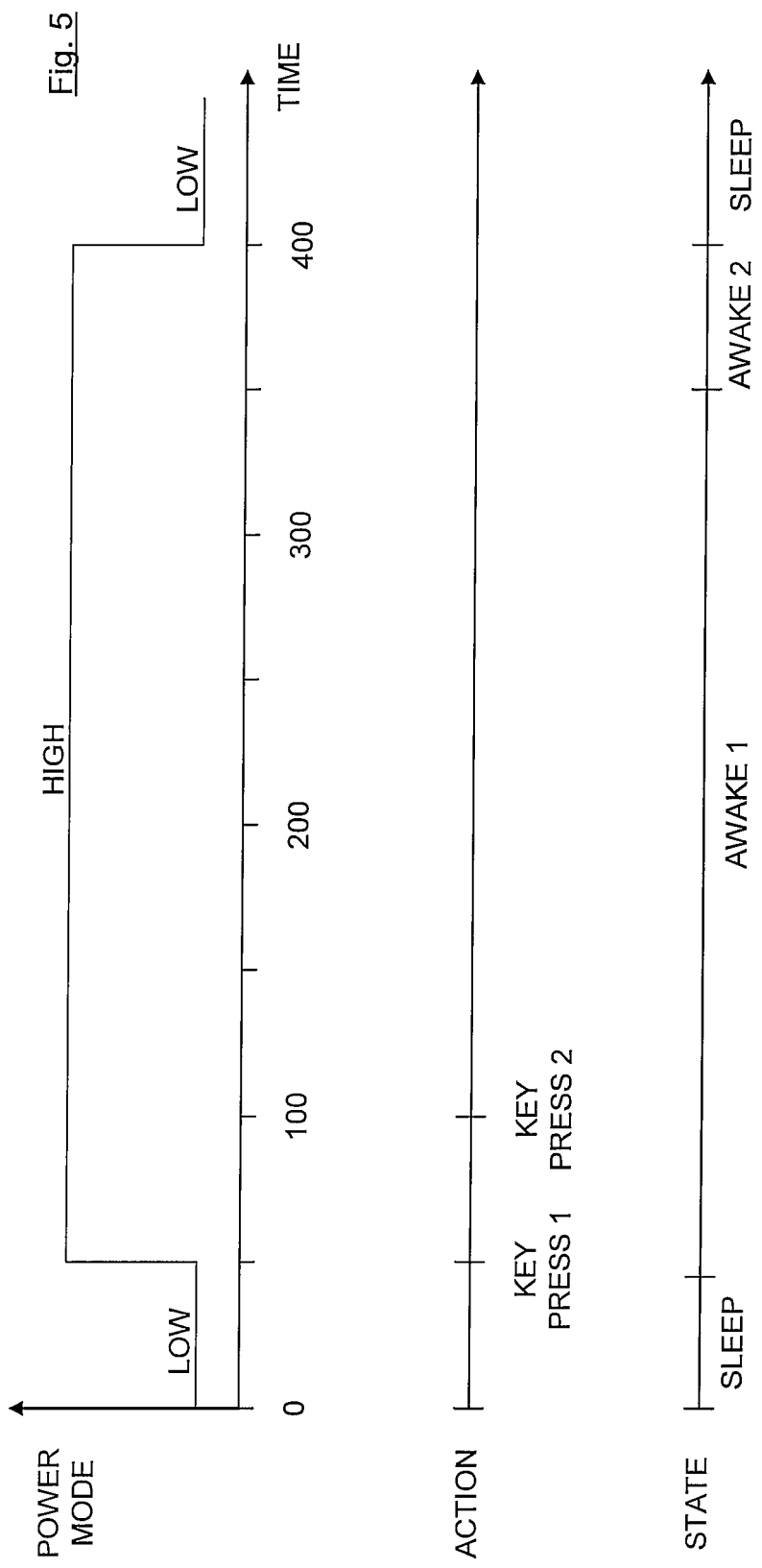

CONTROL OF AWAKE TIME IN MOBILE DEVICE WITH EVENT BASED TIME PERIOD FOLLOWED BY SLEEP MODE ALGORITHM

This invention relates to a mobile device and a method of operating a mobile device. The invention provides a mechanism to implement an awake time in mobile devices.

In all electronic mobile devices, a source of power must be provided to provide the necessary energy to power the mobile device. In mobile devices such as mobile phones and digital cameras, a battery (which may be rechargeable) is provided that is used to power the mobile device. Since such devices are continually increasing in complexity, the demands made on the battery are, likewise, constantly rising. It is therefore a constant concern in the design of mobile devices to minimise power consumption, in order to maximise the length of time that a battery will provide sufficient power for the mobile device to operate.

Normally all mobile devices have a mechanism to power down the internal components when the mobile device is in an idle mode. This is sometimes called a sleep mode. This is a low power mode, and is very important in the enhancing of the power utilization of the mobile device. The processor clock of the mobile device is frozen, and a low frequency clock is enabled, to wake up the processor after a predetermined period of time, normally the DRX (discontinuous reception) period. In addition, the processor of the mobile device wakes up if there is a user input to the device, which basically generates an interrupt to the processor or any other interrupt sources.

However, there do not exist many effective mechanisms available to predict how much time the processor should remain awake after it has been waken up, say, due to user events. Normally the mechanism which is usually followed is a lowest priority background task, which runs when nothing else is being executed by the processor. This task determines the sleep period and programs a timer, which works with the help of the low frequency clock, and then freezes the processor clock. When this timer expires, it wakes up the processor. All this happens through the use of a PDCU (Power Down Control Unit).

However, there exists a situation when the processor may go to sleep mode between two key presses from the user (when the background loop runs in between the key presses). Also, there can be situation that the processor goes to a sleep between two successive DMA (Direct Memory Access) operations separated by few milliseconds or any other pending hardware event meant for the processor (when the background loop runs in between the two DMA operations). This can be raised as a serious concern by the user, because of introduction of high latency in his normal operations.

An improvement is described in United States of America Patent Application Publication US 2004/0043797, which discloses a method and apparatus for reducing the amount of power that is required when using a wireless communication protocol, such as IEEE 802.11. In a wireless communication system, a mobile device that is a part of the communication system must be awake in order to send or receive a message. A device in an awake mode consumes more power than a device in its asleep mode. The disclosure in this document obviates the need for a device to wake up frequently to receive gateway broadcasts. Instead of waking up for every broadcast, the device remains awake for a predetermined holdover period after sending a message. By reducing the total amount of time the device is awake, the invention achieves significant power savings. The holdover period should be set so that it is short enough to achieve the desired amount of power savings without slowing down the speed of communication too much.

The system described in this document, of keeping the device in a high power mode for a specific time after sending a message, is not flexible enough to be efficient in power saving. There are many operational situations where the implementation of this system will either not save power, or in fact, will increase power consumption. Similarly, it also does not take into account the user's interaction with the mobile device, which on many occasions will be detrimentally affected by the system described in this document, if the device enters sleep mode in-between user interactions with the device.

It is therefore an object of the invention to improve upon the known art.

According to a first aspect of the present invention, there is provided a method of operating a mobile device comprising operating the mobile device in a low power mode, switching the mobile device to a high power mode, in response to an event, identifying the event as specific type of event, selecting a time period according to the identified type of event, preventing an algorithm for switching the mobile device to the low power mode from executing, for said time period, and executing said algorithm.

According to a second aspect of the present invention, there is provided a mobile device comprising a processor and a power mode control system, wherein the processor is arranged to operate in a low power mode, and the power mode control system is arranged to switch the processor to a high power mode, in response to an event, to identify the event as specific type of event, to select a time period according to the identified type of event, to prevent an algorithm for switching the mobile device to the low power mode from executing, for said time period, and to execute said algorithm.

Owing to the invention, it is possible to provide a mobile device that has a flexible and efficient switching between power modes controlled by a combination of factors. Two principal elements deliver the advantage of the invention, and neither is present in any known device. Firstly, the length of the awake time following a detected event depends upon the type of event. Different events, such as incoming message or user key press, will define different time periods for the awake phase. Secondly, when the awake period ends, the device does not automatically enter sleep (low power) mode. Instead, the mobile device executes its normal sleep mode algorithm that defines if the device enters sleep mode. This means that the awake period is defined as a specific time period in which this algorithm is prevented from executing. These two features together result in an enhanced user experience and provide an improvement over the known art.

Advantageously, while said algorithm is prevented from executing, the mobile device detects a second event, identifies the second event as specific type of event, and selects a new time period according to the identified type of event. The mobile device can be adapted to respond to a second event occurring while the time period during which the algorithm for switching power mode is being prevented from operating. So, for example, if the first event is a key being pressed by a user of the mobile device, and this results in 250 ms time period during which the sleep algorithm is suspended, then if there is a key press by the user during this 250 ms time period, then a new time period will be calculated.

Different possibilities exist for how the new time period can be calculated. In a first embodiment, the new time period comprises the sum of the time period associated with the first event and the time period associated with the second event. In a second embodiment, the new time period comprises the time period associated with the second event, and a third possibility is that the new time period comprises the longer of the time period associated with the first event and the time period associated with the second event. The implementation of the calculation of the new time period is a design choice and could be best decided in a different way for different devices, for example.

Preferably, the types of events comprise key operations, display updates and incoming communications. Each of the types listed will have different time periods associated with them, for example, 250 ms for key operations, 60 ms for display updates and 40 ms for incoming communications. These can be adjusted according to the type of mobile device that is implementing the system, and can be subdivided into separate sub-categories, with, for example, the key operations split into different categories depending upon the context of the current operational status of the mobile device. For example, in a mobile phone, a distinction could be made between the pressing of a specific key in the context of typing out a text message, or in the context of making a menu selection within the menu system of the user interface. Other types of events can be chosen, as an addition to the list of types of events detailed above, depending upon the function of the device. In a digital camera, pressing the shutter button to capture an image may be defined as one type of event in its own right.

Embodiments of the present invention will now be described, by way of example only, with reference to the accompanying drawings, in which:—

FIG. 5 is a diagram showing an example performance of power mode against time for the mobile device.

Figure 1:
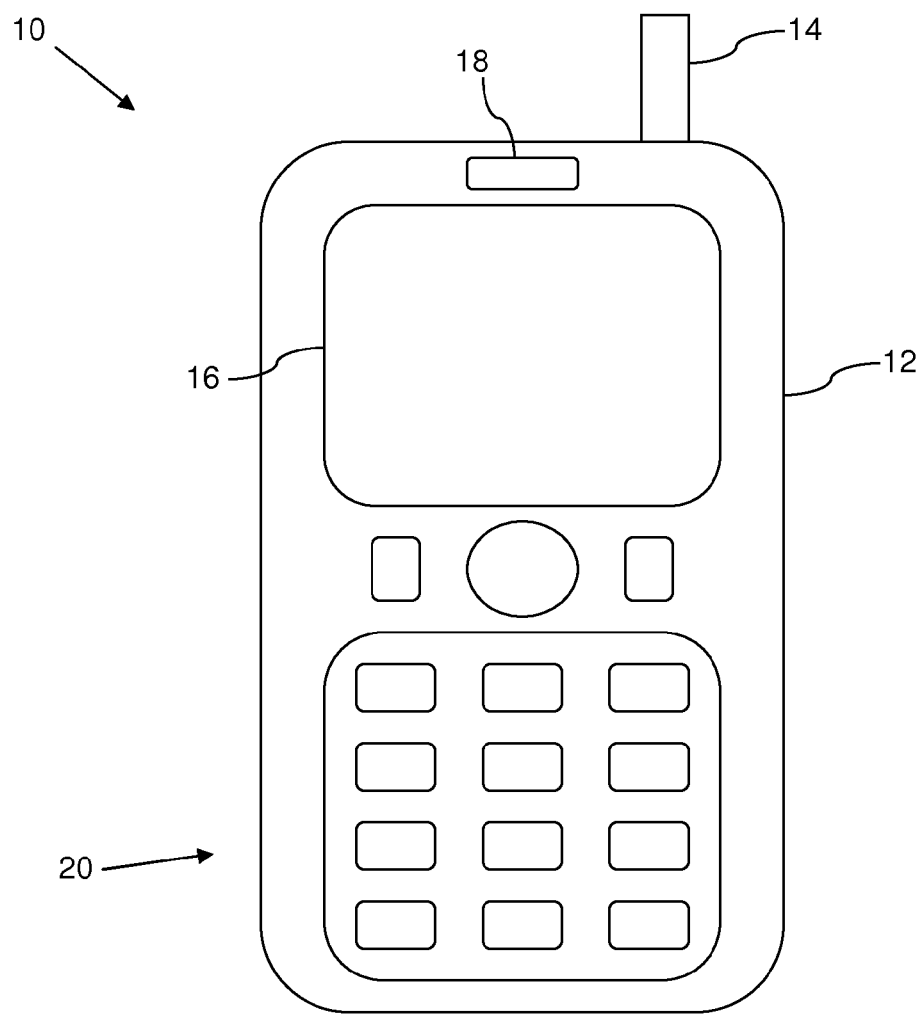
FIG. 1 is a schematic diagram of a mobile device.

FIG. 1 shows an example of a mobile device 10, in this case a mobile phone that can participate in one or more wireless networks, which can take advantage of the invention described above. It is common for mobile phones to participate in wide area networks such as GSM and in addition to have short-range wireless capability provided by a standard such as Bluetooth. The mobile device 10 includes the conventional components of a body 12, an antenna 14, a display 16, a speaker 18, and a variety of keys making up a user interface 20.

The mobile device 10 also has internal circuitry and a battery that is used for powering all of the various components that make up the device 10. The battery is a rechargeable battery that a user can recharge by connected a suitable power cable to the mobile device 10. Any user input received via the user interface 20, requires power from the battery, as does the operation of the display 16 and speaker 18. All other functions, such as the sending and receiving of voice and text messages also require power from the battery of the mobile device 10.

As described above, to reduce the load on the battery, the mobile device 10 has two power modes. The operating mode of the mobile device 10 is a high power mode, which it will utilise whenever any task is being carried out under the control of the internal circuitry. The mobile device 10 also has a low power mode, which the mobile device 10 switches to under the control of a sleep mode algorithm, which is usually after a period of time has elapsed since the last task instructed by the circuitry. This algorithm is responsible for deciding when to enter a low power (sleep) mode. The low power mode powers down parts of the internal circuitry to reduce power consumption.

Figure 2:
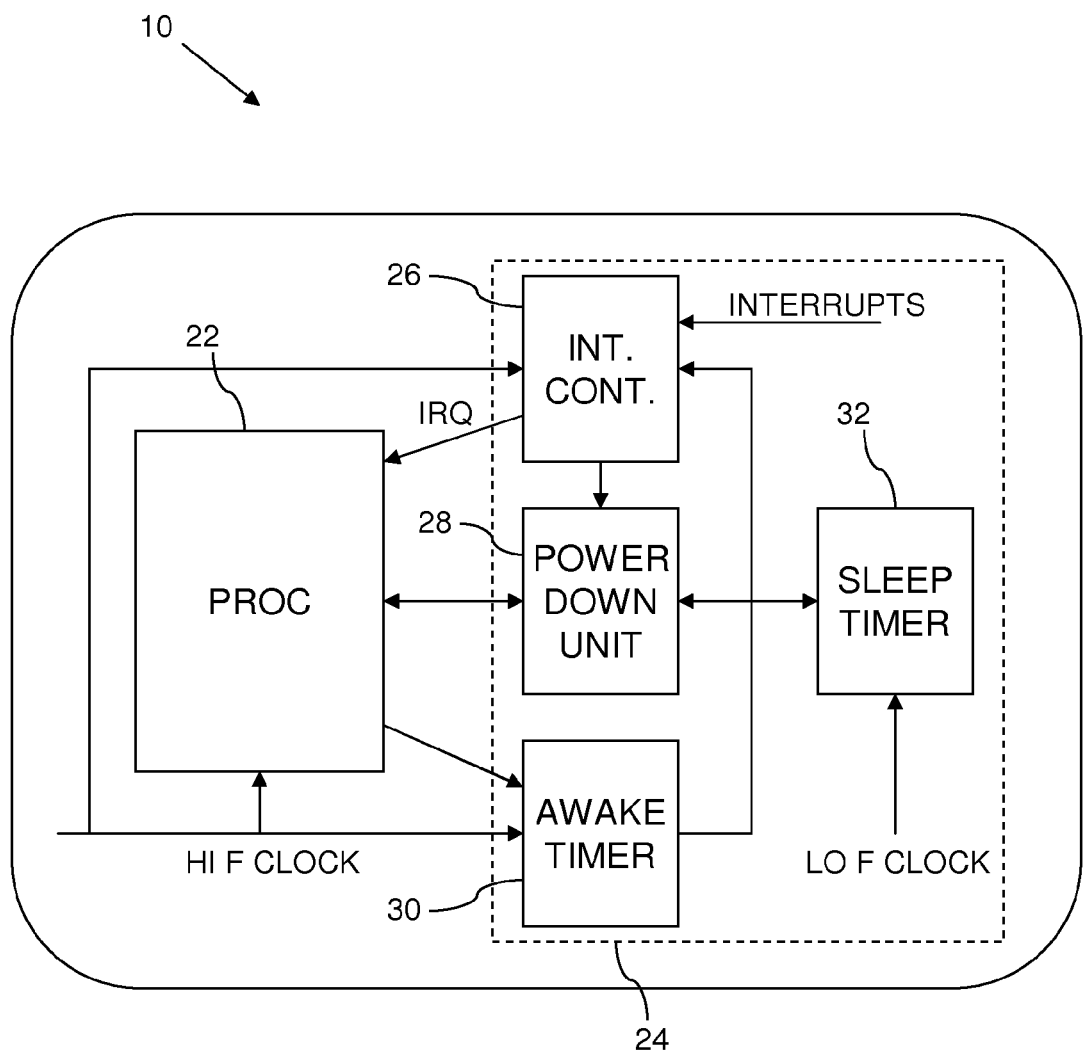
FIG. 2 is a schematic diagram of internal components of the mobile device.

FIG. 2 shows a schematic diagram of some of the internal circuitry of the mobile device 10. A processor 22 is connected to various other internal components that make up a power mode control system 24. The processor 22 is the relatively high consumer of power within the internal circuitry and is clocked by a high frequency clock (shown as HI F CLOCK in the Figure).

Connected to the processor 22 are various components within the power mode control system 24, being an interrupt controller 26, a power down control unit 28 and an awake timer 30. The power mode control system 24 also includes a sleep timer 32, which is clocked by a low frequency clock (shown as LO F CLOCK in the Figure). The interrupt controller 26 receives interrupts from elsewhere in the mobile device 10, and these are used to trigger the switch in the mobile device 10 from a sleep mode to an awake mode.

Figure 3:
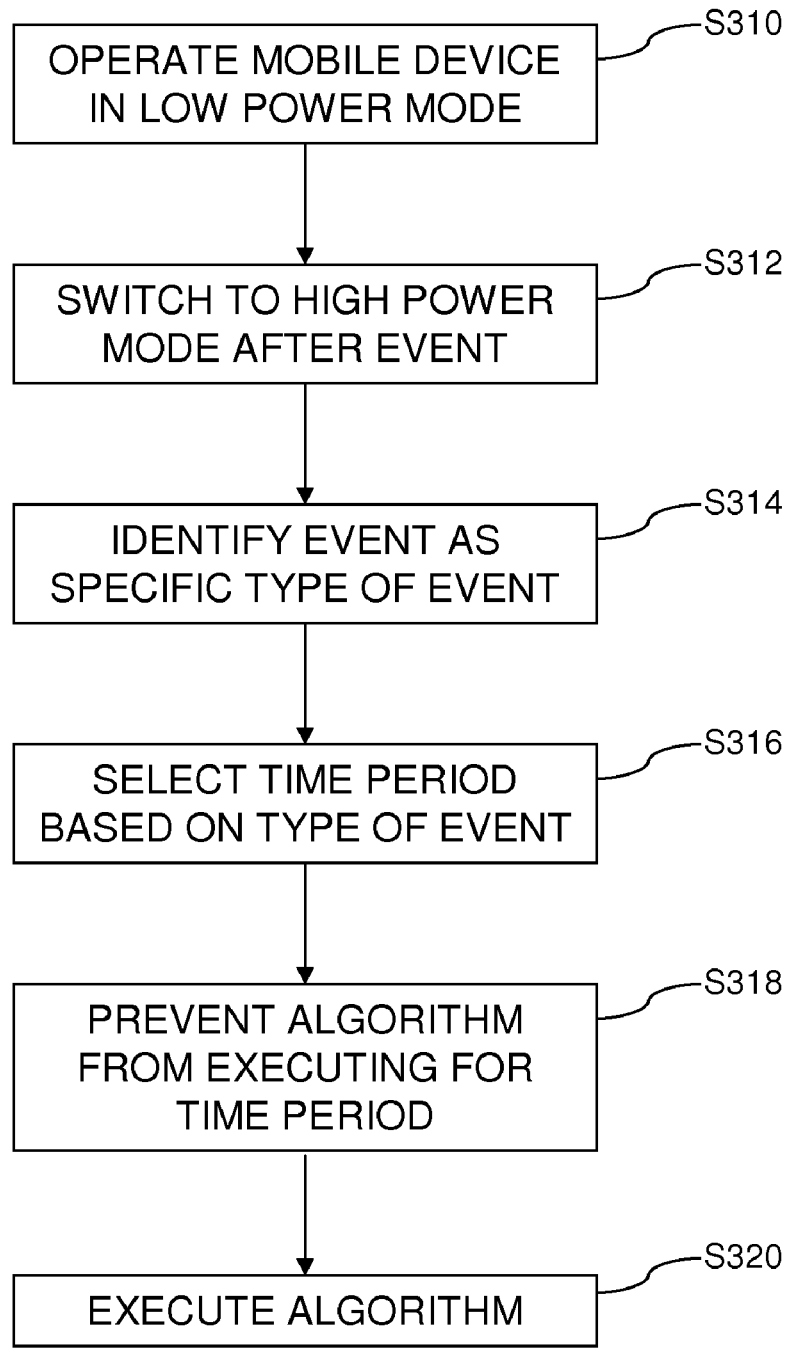
FIG. 3 is a flow diagram of a method of operating the mobile device.

FIG. 3 summarises the method of operating the mobile device 10. This method comprises, firstly at step S310, operating the mobile device 10 in the low power mode. Once an event occurs, such as the user pressing a key on the user interface 20, of the mobile device 10, then the second step S312 occurs, which comprises switching the mobile device 10 to a high power mode, in response to the detected event.

The next step is step S314 which comprises identifying the event as specific type of event. The power mode control system 24 identifies the type of event that has just woken up the processor 22 at the system initialization. After the event has been identified, then at step 316 there is selected a time period according to the identified type of event. The power mode control system 24 associates a hysteresis time for each type of event, for example, 250 ms for key operations, 60 ms for a display update etc. at the system initialization. These values are predetermined and stored within the mobile device 10.

After a time period has been selected, according to the type of event, the step S318 of preventing the algorithm for switching the mobile device to the low power mode from executing, for said time period, is carried out. When any event occurs, the hardware awake timer 30 is programmed with the hysteresis period of the corresponding operation. This can be achieved by setting a StartSleepModeflag to FALSE to stop the background task (the algorithm) from performing the power down procedure.

Once this timer expires, an interrupt is triggered to the processor 22 via the interrupt controller 26 to initiate a sleep mode procedure by setting the StartSleepModeflag to TRUE for the background task to invoke power down procedure (executing the algorithm at step S320) via the PDCU 28. If another event occurs before this hysteresis period expires, then the awake timer 30 is set to the maximum of the hysteresis period of the second event and the previous period. The StartSleepModeflag is set to FALSE to stop the background task from performing the power down procedure.

The principal purpose of preventing the sleep mode algorithm from executing is to ensure that the mobile device 10 does not enter sleep mode while the user is in the middle of an interaction with the mobile device 10. If this were to occur, then the user would experience high latency in the task that they are currently carrying out, as the mobile device 10 is constantly switching from low to high power mode (with the consequent time delay), every time there is an event taking place.

Figure 4:
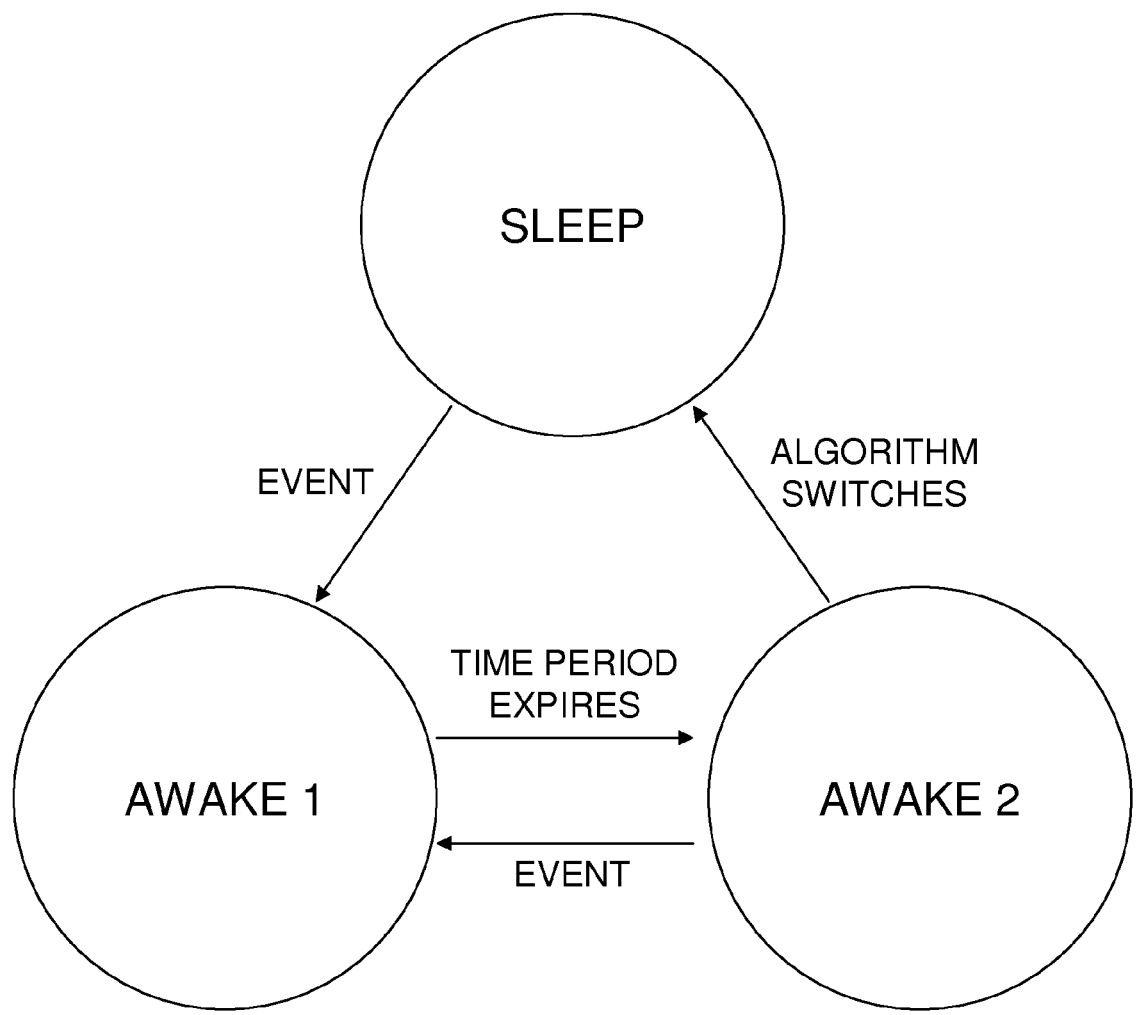
FIG. 4 is a state diagram of power modes of the mobile device.

FIG. 4 shows a state diagram summarizing the power modes of the mobile device 10. The state "SLEEP" is a low power mode, and the two "AWAKE" states are high power modes. When the mobile device 10 is in the sleep state, any event, such as a key press, will cause the mobile device 10 to awake and therefore move to the "AWAKE 1" state. This state is defined as the state in which the device's sleep mode algorithm is prevented from operating. As can been seen from the Figure, it is not possible to go from the "AWAKE 1" state to the "SLEEP" state.

As discussed above, the mobile device 10 remains in the state "AWAKE 1", for a period of time defined by the nature of the event that resulted in the switch to that state. If further events occur while the mobile device 10 is in the "AWAKE 1" state then the time period is extended or adjusted, as discussed above. Once the time period has expired, then the mobile device 10 will move to the state "AWAKE 2".

When the mobile device 10 is in the state "AWAKE 2" then the algorithm that decides when to switch to the low power (sleep) mode is no longer prevented from executing. How this algorithm functions is not material to the invention described in this document, it may be based upon the number of events in the last two seconds, or any other suitable method to decide whether to power down the mobile device 10. While the mobile device 10 is in this state, if any event occurs, then the mobile device 10 will switch back to the "AWAKE 1" state and once again the algorithm will be prevented from executing.

When the mobile device 10 is in the "AWAKE 2" state, if the algorithm produces an output indicating that the mobile device 10 should switch to the low power mode, then the mobile device 10 will move to the "SLEEP" state and the mobile device 10 will be powered down. Once the mobile device 10 has entered the "SLEEP" state, then it will remain in that state until the mobile device 10 detects that another event has occurred, in which case it will move to the "AWAKE 1" state and the process will begin all over again.

An example of the operation of the mobile device 10 is shown in FIG. 4. In the example of this Figure, the hysteresis time for a key press by the user is 250 ms. The graph at the top of the Figure shows the power mode that the mobile device 10 is in, switching between high power and low power. At time 0 the mobile device 10 is in a low power mode. At time 50, the user presses a key on the user interface 20 of the mobile device 10. This is shown on the Action axis below the graph. This generates a change in state from the "SLEEP" state to the "AWAKE 1" state in relation to the state diagram of FIG. 4. The current state of the mobile device 10 is shown on the State axis at the bottom of FIG. 5. A time period of 250 ms is generated once the event is identified as a key press, and the mobile device 10 suppresses the algorithm that will decide whether to switch to a low power mode, for this time period.

At time 100, the user makes another key press on the mobile device 10, shown as key press 2 in the Figure. This leads to a recalculation of the time period, which will now be a further 250 ms from the time 100. At time 350, mobile device 10 switches to the "AWAKE 2" state of FIG. 4, as shown in FIG. 5 on the State axis, where the new state is shown. It can be seen in the graph at time 350 that the power mode has not changed. The mobile device 10 remains in the "AWAKE 2" state for a further 50 ms before the algorithm eventually executes to generate an output to that the mobile device 10 should now move to the "SLEEP" state, and power down.

The invention claimed is:

1. A method of operating a mobile device comprising:
   operating the mobile device in a low power mode,
   switching the mobile device to a high power mode, in response to an event,
   identifying the event as specific type of event,
   selecting a time period according to the identified type of event,
   preventing a sleep mode algorithm, which decides if the mobile device is switched to the low power mode, from executing for said time period, and
   executing said algorithm upon expiration of said time period,
   wherein the mobile device does not automatically switch to said low power mode upon expiration of said time period but instead executes the sleep mode algorithm that decides if the device enters said low power mode.

2. A method according to claim 1, and further comprising, while said algorithm is prevented from executing, detecting a second event, identifying the second event as specific type of event, and selecting a new time period according to the identified type of event.

3. A method according to claim 2, wherein the new time period comprises the sum of the time period associated with the first event and the time period associated with the second event.

4. A method according to claim 2, wherein the new time period comprises the time period associated with the second event.

5. A method according to claim 2, wherein the new time period comprises the longer of the time period associated with the first event and the time period associated with the second event.

6. A method according to claim 1, wherein the types of events comprise key operations, display updates, incoming communications and processor pending events.

7. A method according to claim 1, wherein the mobile device is in a SLEEP state when in the low power mode and switches to an AWAKE 1 state when in the high power mode, and wherein the mobile device switches to an AWAKE 2 state upon expiration of the time period, wherein it is not possible for the mobile device to go directly from the AWAKE 1 state to the SLEEP state.

8. A method according to claim 1, wherein the mobile device is in a SLEEP state when in the low power mode and switches to an AWAKE 1 state when in the high power mode, and wherein the mobile device switches to an AWAKE 2 state upon expiration of the time period, wherein it is not possible for the mobile device to go directly from the AWAKE 1 state to the SLEEP state without first entering the AWAKE 2 state.

9. A method according to claim 1, wherein the mobile device is in a SLEEP state when in the low power mode and switches to an AWAKE 1 state when in the high power mode, and wherein the mobile device switches to an AWAKE 2 state upon expiration of the time period, wherein it is not possible for the mobile device to go directly from the AWAKE 1 state to the SLEEP state, and wherein the mobile device switches back to the AWAKE 1 state from the AWAKE 2 state if another event occurs while in the AWAKE 2 state.

10. A mobile device comprising a processor and a power mode control system, wherein the processor is arranged to operate in a low power mode, and the power mode control system is arranged to switch the processor to a high power mode, in response to an event, to identify the event as specific type of event, to select a time period according to the identified type of event, to prevent a sleep mode algorithm, which decides if the mobile device is switched to the low power mode, from executing; for said time period, and to execute said sleep mode algorithm upon expiration of said time period, wherein the mobile device does not automatically switch to said low power mode upon expiration of said time period but instead executes the sleep mode algorithm that decides if the device enters said low power mode.

11. A device according to claim 10, wherein the power mode control system is further arranged, while said algorithm is prevented from executing, to detect a second event, to identify the second event as specific type of event, and to select a new time period according to the identified type of event.

12. A device according to claim 11, wherein the new time period comprises the sum of the time period associated with the first event and the time period associated with the second event.

13. A device according to claim 11, wherein the new time period comprises the time period associated with the second event.

14. A device according to claim 11, wherein the new time period comprises the longer of the time period associated with the first event and the time period associated with the second event.

15. A device according to claim 10, wherein the types of events comprise key operations, display updates, incoming communications and processor pending events.

16. A device according to claim 10, wherein the mobile device is in a SLEEP state when in the low power mode and switches to an AWAKE 1 state when in the high power mode, and wherein the mobile device switches to an AWAKE 2 state upon expiration of the time period, wherein it is not possible for the mobile device to go directly from the AWAKE 1 state to the SLEEP state.

17. A device according to claim 10, wherein the mobile device is in a SLEEP state when in the low power mode and switches to an AWAKE 1 state when in the high power mode, and wherein the mobile device switches to an AWAKE 2 state upon expiration of the time period, wherein it is not possible for the mobile device to go directly from the AWAKE 1 state to the SLEEP state without first entering the AWAKE 2 state.

18. A device according to claim 10, wherein the mobile device is in a SLEEP state when in the low power mode and switches to an AWAKE 1 state when in the high power mode, and wherein the mobile device switches to an AWAKE 2 state upon expiration of the time period, wherein it is not possible for the mobile device to go directly from the AWAKE 1 state to the SLEEP state, and wherein the mobile device switches back to the AWAKE 1 state from the AWAKE 2 state if another event occurs while in the AWAKE 2 state.

* * * * *